Nov. 24, 1931.  H. K. PINKERTON ET AL  1,833,885

WATER COOLER

Filed Nov. 22, 1926

INVENTORS
*Howard K. Pinkerton*
and *Freeman L. Rhyndress.*
BY
ATTORNEY

Patented Nov. 24, 1931

1,833,885

UNITED STATES PATENT OFFICE

HOWARD K. PINKERTON AND FREEMAN L. RHYNDRESS, OF KANSAS CITY, MISSOURI; SAID PINKERTON ASSIGNOR TO W. H. FRAZELL, JR., OF KANSAS CITY, MISSOURI

WATER COOLER

Application filed November 22, 1926. Serial No. 150,051.

Our invention relates to water coolers and more particularly to an improved cooling tank for water wherein refrigeration coils are employed for cooling the water.

Heretofore in coolers of this type the water to be cooled is circulated through coils submerged in a liquid serving as the cooling medium.

In coolers of this type, however, the quantity of adequately cooled water available is limited to the capacity of the coils carrying the water. The relatively small supply of cooled water in the coils is soon exhausted when demand is heavy, and the water withdrawn thereafter issues in an insufficiently cooled condition because of its rapid passage through the coils which offer small cooling surfaces to such water, said surfaces being inadequately cooled by the secondary cooling medium.

It is the purpose of our invention to provide a water cooling tank in which coils carrying the refrigerant are in direct contact with the water to be cooled, so that the water is directly cooled, a large quantity of cooled water is available for unusual demand, uncooled water introduced to replace volume of cooled water withdrawn rests in the tank in proximity to the refrigerant coils and relatively distant from the cooled water available for withdrawal and must pass among said refrigerant coils before being withdrawn, whereby efficient production of the required amount of adequately cooled water is attained, together with saving in operating costs.

Another purpose of our invention is to provide a cooler in which the refrigeration means and particularly such means as we propose, is readily accessible for inspection and repair, and that may be inspected and repaired without removal of the same from the tank.

In accomplishing these and other objects of the invention we have provided improved details of structure, wherein.

Figure 1:
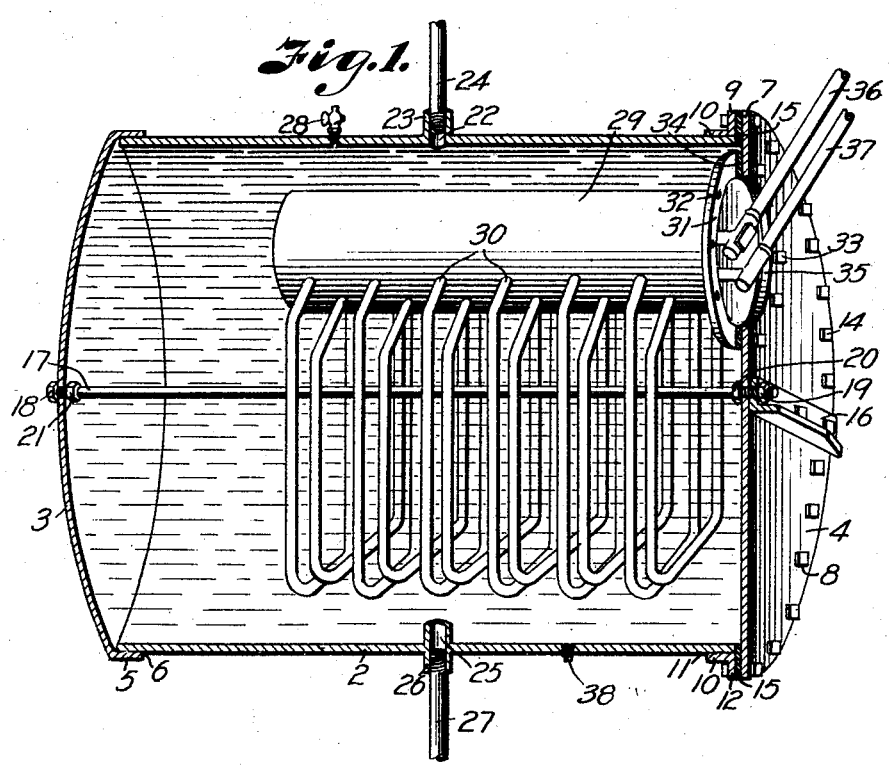
Fig. 1 is a sectional perspective view of a cooler embodying our invention.
Figure 2:
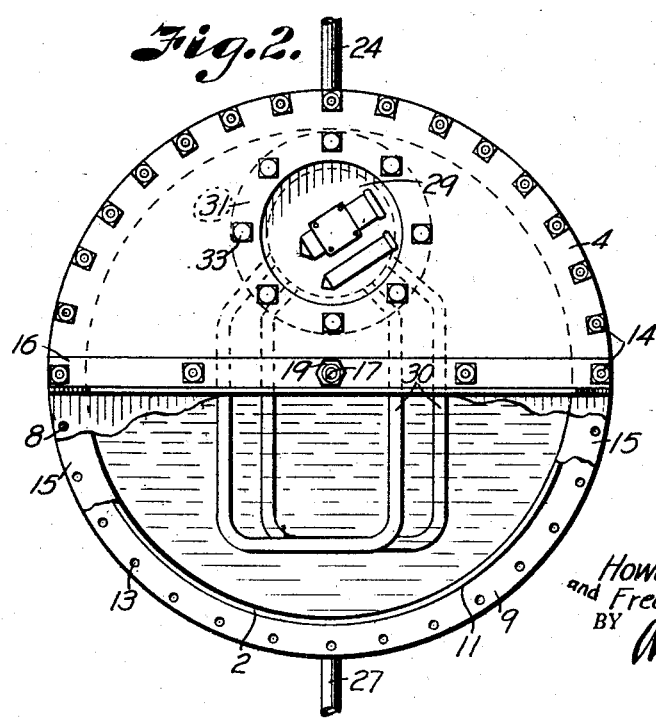
Fig. 2 is a front elevational view of the cooler, a part of the cover being broken away to expose the refrigeration coils.

Referring more in detail to the drawings by numerals of reference:

1 designates a tank of cylindrical form comprising a side wall 2, end 3 and cover 4.

The end 3 is preferably convex in form to provide strength, and has a depending peripheral flange 5 to receive the cylindrical side wall 2 which is preferably welded thereto as at 6.

The cover 4 of the tank 1 comprises a circular plate of substantially larger diameter than the cylindrical wall portion of the tank to provide a flange 7 having a series of openings 8 therein. An annular angle 9 is provided, adapted to encircle the wall portion oppositely of the end 3, and having a flange 10 welded to the side wall as at 11, the other flange 12 of said angle 9 having a series of openings 13 adapted to align with the smaller openings 8 of the cover flange 7. The cover is secured to the angle 9 by bolts 14 which extend through the openings 8 and 13 of cover 4 and angle flange 12, the joint being sealed by a gasket 15 to prevent leakage from the tank.

Reinforcement means is provided to assist the tank in withstanding city water pressure, comprising an angle bar 16 positioned on and coextensive with a diameter of the cover 4 exteriorly thereof and which is preferably riveted thereto; a rod 17 disposed axially of the tank and projecting through said cover and said angle bar 16 and through said end 3, the rod having a head 18 engaging the end 3 and being secured by the nut 19 that engages the angle bar 16. Lock nuts 20 and 21 are provided at tank cover and tank end regions of the rod 17 for additionally relating the rod to cover and end respectively and for strengthening purposes.

The tank is provided about midway of its cylindrical side wall and in the top portion thereof with water inlet opening 22 and an inlet coupling 23 associated with said opening and preferably welded to the wall, said coupling being threaded to receive an inlet pipe 24 connected with the water service. The tank is provided with a water outlet opening 25 positioned in an opposite or bottom portion of the wall 2 approximately on a line of said wall marked by projections of a line from the inlet opening through the axis of the cylindrical side wall. An outlet coupling 26 is provided preferably welded to the tank and adapted to enter inwardly of the tank to form a guard for preventing sediment from entering the outlet pipe. The coupling is threaded to receive the outlet pipe 27 which connects the tank to the means of delivering the cooled water to the users.

An air vent 28 is provided, and positioned in the side wall adjacent the inlet and adapted for permitting the air to escape from the tank while the tank is being filled; and closed when the tank has been filled.

A refrigeration unit is provided, contained within the tank, which may be of any desired type or make and is here shown as comprising a receiving manifold 29 positioned between the inlet and outlet openings and across the path of water flowing from the inlet to the outlet, and provided with a series of expansion coils 30 extending toward the outlet and having a circumferential flange 31 provided with openings 32 for receiving bolts 33 by which the unit may be attached to the cover 4, gaskets 34 being provided between flange 31 and cover 4 to prevent leakage.

The cover 4 is provided with an opening 35 wherewith the manifold 29 is related, and through which the suction and liquid lines 36 and 37 of the refrigerating unit may extend, said opening providing for ready access to the interior of the manifold. Means illustrated at 38 as a drain are provided for the removal of accumulation of sediment from the tank without disturbance of the cover.

Our device as thus constructed, provides therefore a refrigeration unit supported within the tank and in direct contact with the water to be cooled, the unit supported by the cover of the tank, a minimum of parts and elements being in contact with said water as a result of which condition contamination of the water is avoided, the direct cooling of the large volume of water that fills the tank resulting in the ability of the device to provide an ample supply of adequately cooled water at any time and to cool incoming water adequately before said water is demanded for withdrawal.

Economy in operation results from efficient use of the refrigerant; and also from the fact that wastage is avoided such as occurs in devices from which water of temperature unsatisfactory to the user may frequently issue.

A further economy in operation is represented in the factor of safety from freezing of the water to be cooled, which our device provides. In ordinary cooling devices using refrigeration coils a body of water is cooled by such coils, and cools the pipes carrying the drinking water that is to be used, the cooled pipes cooling the drinking water. In such devices, the refrigerating coils may freeze the intermediary water medium when the drinking water is stationary in the container of the drinking water, namely, the said pipes, for a considerable period; and through such conducting medium exert freezing influence on the pipes carrying the drinking water, and so cause the freezing of said drinking water in said pipes—the water contacting the said pipes, and remote from the axis of said pipes, freezing first. Since the application of freezing influence to the exterior of a pipe containing water tends to produce ice in such pipe in a manner tending to burst the pipes, the freezing process in an ordinary cooling device as described, will tend to cause bursting of the cooling pipes. In our device, any freezing influence of the refrigerating unit, however prolonged, will not cause the bursting of the container of the drinking water; because the source of freezing, the refrigerating coils, is positioned around the axis of the body of drinking water being cooled, they freezing it, if at all, from center towards circumference, whereby the expansion of the body of drinking water, in freezing, has outlet through the body of water to the inlet and through such inlet to and upon the water in the pipes supplying the tank; the expansion causing merely back-pressure, for example, against the pressure of city water system.

While we have described and are claiming a particular construction and form. we wish to be understood as claiming also adaptations thereof and incidental accessories thereto that may be suggested by ordinary knowledge and skill, for example, the insulation, as with cork, of the tank; the transmission of a fluid cooled in such a tank; the relating to the tank and its contents of other factors to receive its influence, and the like.

It is obvious that liquids other than water may be refrigerated by the same construction; and that incidental arrangements may be installed to care for mechanical problems, such as a deflector or baffle to retard the passage of the incoming water as the cooled water is withdrawn; or for the same purpose the inlet may be provided with an elbow and horizontal pipes having superior openings for direction of the inflow upwardly and distantly from the outlet.

What we claim and desire to secure by Letters Patent is:

1. In a water cooler, a horizontally elongated water tank having a central top inlet and a central bottom outlet, a removable cover closing one end of the tank having an opening adjacent the upper edge thereof, a cylindrical refrigeration manifold within the tank having a flange for attaching the manifold to the cover concentrically of said opening for support adjacent the inlet, and cooling coils extending from the manifold toward the outlet directly in the path of water flowing from the inlet to the outlet, said opening providing for admission of connections through the removable cover to the manifold and for access to the interior of the manifold.

2. In a water cooler including a horizontal elongated water tank having a central top inlet and a central bottom outlet, a removable cover closing one end of the tank and having an opening adjacent the upper edge thereof, a cylindrical refrigeration manifold supported from the cover within the tank longitudinally thereof and cooling coils spaced from the walls of the tank and from the axis thereof, the manifold and coils extending between the inlet and the outlet directly in the path of the water whereby water entering the inlet is forced to flow around the manifold and the coils to reach the outlet.

3. In a water cooler, a horizontally elongated water tank having a top inlet and a bottom outlet, a cover closing one end of the tank having an opening adjacent the upper edge thereof, a manifold within the tank having a flange for attaching the manifold to the cover concentrically of said opening for support adjacent the inlet, and a cooling coil extending from the manifold toward the outlet directly in the path of water flowing from the inlet to the outlet.

In testimony whereof we affix our signatures.

HOWARD K. PINKERTON.
FREEMAN L. RHYNDRESS.